United States Patent Office 2,766,982
Patented Oct. 16, 1956

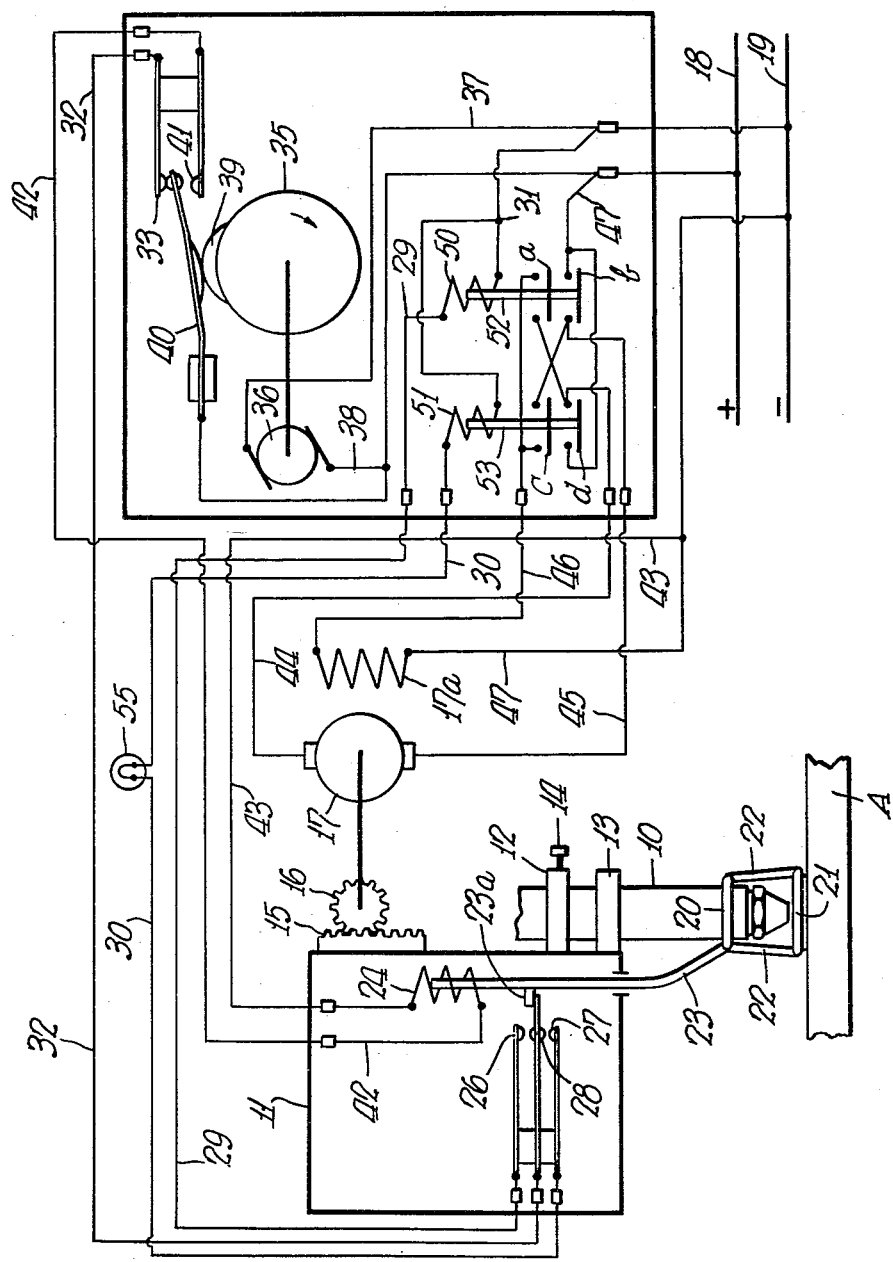

2,766,982

CONTROL MECHANISM FOR CUTTING TORCHES

Richard Bechtle, Frankfurt am Main, and Otto Metzner, Bornhof, Gummersbach, Germany, assignors to Adolf Messer G. m. b. H., Frankfurt am Main, Germany, a corporation of Germany Application May 13, 1952, Serial No. 287,471

21 Claims. (Cl. 266—23)

In the cutting of metal sheets or other types of workpieces by means of a cutting torch, it is important that the spacing between the torch tip and the surface of the workpiece be maintained substantially constant, in order to secure the most efficient results. As either the torch or the workpiece must be progressively advanced in making the cut, and as the surface of the workpiece may be warped, curved, or otherwise depart from a true plane, it is often necessary to move the torch toward and from the workpiece as the cutting operation proceeds, so that the spacing between the torch tip and the workpiece will be maintained substantially constant. For effecting this raising and lowering of the torch in respect to the workpiece the torch is provided with a rack bar engaged by a pinion driven by a reversible electric motor. Thus by operating the motor in one direction or the other the torch is raised or lowered in respect to the workpiece.

The provision of a follower contacting the surface of the workpiece and acting to lift or lower the torch is reasonably satisfactory in many cases, but the follower cannot contact the surface at the point of cutting, and ordinarily makes contact at one side of the torch or in advance of it. As the surface of the plate may be curved or irregular, such a follower cannot accurately control the spacing at the cutting point. Furthermore, a follower is subject to abrasion by the workpiece, or irregular movement if the surface of the latter be rough and the follower applies the force required to mechanically raise the torch.

The main object of the invention is to eliminate the need for a workpiece follower sliding on the workpiece, and avoid the objection to such a follower or sliding member. As an important feature the torch is provided with a workpiece contacting member which is intermittently raised and dropped onto the workpiece so that it engages the workpiece only intermittently and only momentarily, and thus does not slide on the workpiece except during the instant of contact, which is of negligible length of time.

As the distance to which the contact member drops or is raised will vary with the spacing of the torch from the workpiece, there is provided means whereby the torch is raised or lowered when the contact member moves in one direction or the other, and beyond predetermined limits in respect to the torch.

In our apparatus there is provided a reversible motor for raising or lowering the torch, and means for controlling the direction of rotation of the motor in accordance with variations in the spacing of the torch and the workpiece.

As an important feature of our invention the operation of the torch raising and lowering mechanism is controlled by a contact member close to and preferably encircling the torch, said member being light in weight, so that it has very low resistance to vertical movement.

As a further feature this member acts to control the operation of the reversible motor which is operatively connected to the torch and acts to positively raise or lower the torch in accordance with the movement of said contact member.

As a further important feature, the contact member is automatically raised and lowered, so that it is in sliding contact with the workpiece intermittently, and only momentarily.

It will be understood that the torch may move over the workpiece or the workpiece may move beneath the torch. To simplify the description it will be assumed that the workpiece remains stationary and the torch moves over it.

In the accompanying drawing the single figure shows somewhat diagrammatically merely one embodiment of our invention, but it will be obvious that various changes may be made within the scope of our invention.

In the form illustrated there is employed a cutting torch 10 which may be of any conventional form, and to which the gases for the heating flame and the oxygen for cutting are delivered, and controlled in the conventional manner. The torch is secured to and supported by a part of the frame which may be moved up or down to effect the proper spacing of the tip of the torch at a fixed distance above the portion of the surface of workpiece A which is to be cut, and is directly below the torch.

As an important feature of this invention this frame part is in the form of a casing 11 which is vertically adjustable and is provided with torch supporting means such as a pair of collars 12 and 13 encircling the torch, and one of which has a screw 14 or other suitable means for clamping the torch to the casing 11. Instead of a clamping screw there may be employed a rack and pinion. By either means, the torch may be adjusted in respect to and clamped to the casing 11 at the desired spacing from the workpiece, so that as the torch moves over an irregular surface of the workpiece the casing and the torch may move up and down, and the torch moves in a path parallel to said surface. For effecting the raising and lowering of the torch to maintain the desired uniform spacing from the curved or irregular surface of the workpiece, the casing may have a rack bar 15 engaged by a gear 16 driven by a reversible motor 17.

As an important feature of our invention means are provided for automatically controlling the direction and extent of rotation of this motor 17 and the gear 16 to maintain the tip of the torch at a uniform distance from the surface of the workpiece A, which may not lie in a single horizontal plane.

Current is delivered from main lines 18 and 19, and the circuit of the motor 17 is controlled in part by a feeler or workpiece follower intermittently moved into and out of engagement with the surface of the workpiece A therebeneath, so that it is subjected to the minimum lateral strain and wear by the advancing workpiece. In the form illustrated this feeler includes a collar 20 encircling and slidable on the torch, and a ring 21 for intermittent contact with the surface of the workpiece and around the flame, the ring and collar being connected by bars 22. For raising and lowering the feeler it has an upwardly extending rod 23, a portion of which constitutes, or is connected to, the armature of a magnet coil 24. The circuit of this coil is intermittently closed and opened so that the feeler is automatically raised out of, and lowered into, contact with the workpiece A as the latter moves therebeneath or the apparatus moves over the workpiece and the circuit of the coil is made and broken.

The surface of the workpiece may not lie in a single horizontal plane, and therefore means are provided for controlling the operation of the motor 17 to raise or lower the torch in order to maintain it at a uniform distance from the portion of the workpiece directly therebeneath. For effecting such adjustment means are provided whereby when the follower moves up or down in other than the predetermined limits, the torch 10 and its casing 11 are raised or lowered as occasion may require. This is effected by controlling the direction and extent of rotation of the motor 17 and gear 16.

In the form shown, the casing is provided with a pair of spaced contacts 26 and 27 and an intermediate contact 28, each mounted on a resilient support. The support for the intermediate one 28 extends into the path of movement of a projection 23a on the rod 23, so that if the workpiece contactor moves down beyond a preselected and limited amount the contact 28 engages contact 27, and if it moves up more than a limited amount it engages contact 26.

The upper contact 26 is connected to a conductor 29, and the lower contact is connected to a conductor 30. In these lines are solenoid coils for operating switches hereinafter referred to, and the two lines 29 and 30 may be connected together at the point 31 beyond these coils, and extend to the main line 19. The intermediate contact 28 is connected by a line 32 to a terminal 33 of a mechanically operated circuit make-and-break device. This includes a disc 35 continuously rotated by a motor 36 supplied with current from the main lines 18 and 19 by wires 37 and 38.

The disc 35 has a cam projection 39 which, during each revolution of the disc 35, lifts and lowers a switch 40 into and out of contact with the terminal 33 of the wire 32, and out of and into contact with a terminal 41 of a wire 42 leading to the solenoid coil 24 which lifts and then permits dropping of the rod 23 which at its lower end is connected to a workpiece contacting device or follower, preferably encircling the torch tip. Thus, during each revolution of the cam disc 35, the circuit of the coil 24 is broken to permit the workpiece contactor to drop onto the workpiece, and then is closed to effect the lifting of it above the workpiece. Thus the workpiece contacting device engages the work only intermittently, but at intervals sufficiently frequent so that the torch may be raised or lowered to maintain a substantially uniform spacing of it from the workpiece. If the workpiece contactor be in the form of a ring 21 encircling the torch tip, the control of the tip spacing is more accurately effected.

As previously noted, the motor 17 is a reversible one, and the making and breaking of the circuit from 28 to either 26 or 27 acts not only to lift and drop the workpiece contactor, but also to control the direction of rotation of the motor 17 which lifts or lowers the torch. This is effected by means of reversing switches operated by the coils 50 and 51 which lift or drop switch operating members 52 and 53 to control the direction of flow of current in the field and armature of the motor 17.

The switch member 52 has two spaced switch blades a and b, and the switch member 53 has two spaced switch blades c and d. The wiring connection is such that when the surface of the workpiece is so high that contact 28 engages contact 26, the coil 50 is energized, and switch member 52 is lifted so that the circuits of the lines 44 and 45 of the armature of the motor, and the lines 46 and 47 of the field of the motor are closed, and the motor 17 rotates in one direction to lower the torch. When contact 28 engages contact 27, coil 51 is energized to lift the switch 53, and the current flows in the reverse direction to rotate motor 17 in the opposite direction to raise the torch.

The wire 43 from the coil 24 is provided with switch operating coil 50, and the wire 30 from the contact 27 is connected to switch operating coil 51. One terminal of each coil is connected at the point 31 and thence to the main line 18, so that the making and breaking of the circuit at 28 acts not only to lift and lower the workpiece contacting member, but also to reverse the motor 17 to keep the torch at the proper spacing from the workpiece.

When the workpiece contacting member is moved up beyond its normal range and closes the circuit between contacts 26 and 28, the coil 50 is energized and switch member 52 is lifted, and when said contacting member goes down beyond its normal range it closes the circuit between 27 and 28, and the coil 51 is energized.

The up and down movement of the contact member or feeler in respect to the torch is limited, so that if the surface of the workpiece is smooth, neither circuit is closed, but if it is curved or irregular and the torch becomes too far from or too close to the workpiece and said member extends to one or the other limits, the motor is operated to raise or lower the torch to restore the proper spacing of it from the workpiece.

The operation of the torch raising and lowering mechanism may be readily observed by providing a lamp 55 in the line 30 from the intermediate contact member 28. When the lamp lights up it indicates that the rotor 17 is receiving current, and when the lamp remains unlit the workpiece contact member is in off position, and neither too high nor too low.

Various changes may be made within the scope of our invention. For instance, the motor 17 may be one continuously rotatating in one direction instead of being reversible. The number of current impulses controlled by the cam 39 may be varied by changing the speed of the motor 36 or by providing the disc 35 with a plurality of switch operating cams 39. The sensitivity may be adjusted by providing greater or less space between the contact 28 and those above and below it. When the motor 17 is momentarily energized it starts, and a second impulse of current will accelerate it. Therefore the motor may run continuously in one direction until the impulses stop, rather than starting and stopping with each impulse. The feeler or workpiece contacting member may operate a reversing clutch and gearing to effect raising or lowering of the torch. The contact member may be raised and lowered in various other ways, for instance pneumatically, hydraulically, photoelectrically, or by capacity or inductive change.

Having thus described our invention what we claim as new and desire to secure by Letters Patent is:

1. An apparatus for automatically controlling the spacing of a cutting torch and a workpiece during their relative lateral movement in the cutting operation, said apparatus including means for adjusting the position of said torch relative to the work, a workpiece contacting member freely movable up and down in respect to said torch, and means controlled by said member when said member moves beyond predetermined limits in respect to said torch for operating said adjusting means to maintain the spacing constant.

2. An apparatus for automatically controlling the spacing of a cutting torch and a workpiece, said apparatus including means for adjusting the position of the torch relative to the portion of the work being cut, a workpiece contactor, means for effecting movement of said contactor intermittently into and out of engagement with the workpiece, and means controlled by said contactor for operating said adjusting means upon movement of said contactor beyond either of its normal limits of movement to maintain the spacing constant.

3. An apparatus for automatically controlling the spacing between a cutting torch and a workpiece, and including a torch carrier, a motor for adjusting the position of said carrier, a workpiece contacting member vertically movable in respect to said torch, means for effecting intermittent movement of said member into and out of contact with the workpiece, and means controlled by said member for controlling said motor to raise or lower said torch when said member moves down or up beyond predetermined limits in respect to the torch.

4. An apparatus for automatically adjusting the spacing of a cutting torch and a workpiece, said apparatus including power means for adjusting the position of the torch, a workpiece contactor, a magnet coil for effecting intermitten movement of said contactor out of engagement with the workpiece and permitting it to drop thereon, and means controlled by said contactor for operating said power means to maintain the desired spacing.

5. An apparatus for automatically controlling the spacing of a cutting torch and a workpiece, said apparatus including electrically operated power means for adjusting the position of the torch, a workpiece contactor, means for moving said contactor intermittently into and out of engagement with the workpiece, switch means in the circuit of said power means for controlling the later, and means controlled by said workpiece contactor for operating said switch means when said contactor moves beyond predetermined limits in respect to the torch to maintain the spacing constant.

6. An apparatus for automatically controlling the spacing of a cutting torch and a workpiece, said apparatus including a motor for raising and lowering said torch, a reversing switch in the circuit of said motor, a member movable alternately into and out of engagement with the workpiece, and means controlled by the position of said member relative to the torch when the member contacts the workpiece for operating said switch.

7. An apparatus for automatically controlling the spacing of a cutting torch and a workpiece, said apparatus including a workpiece contacting member, a magnet coil for raising said contactor, means for intermittently breaking the circuit of said coil to permit dropping of said contactor, and means for reversing the operation of said magnetic coil when said contactor moves beyond predetermined limits.

8. An apparatus for controlling the spacing of a cutting torch in respect to a workpiece, including a rack bar for operative connection to a torch, a pinion engaging said rack bar, means for rotating said pinion to raise or lower said torch, a workpiece contacting member, means for lifting said member in respect to the torch and out of contact with the workpiece, and dropping it onto said workpiece, and means controlled by the position of said member relative to the torch when the member contacts the work piece for controlling the direction of rotation of said pinion.

9. An apparatus for controlling the spacing of a cutting torch in respect to a workpiece, including a reversible motor for moving said torch toward and from the workpiece, a workpiece contacting member movable into and out of engagement with said workpiece, a solenoid for lifting said member, means for intermittently making and breaking the circuit of said solenoid to lift and drop said contacting member, and means operated by the position of said member relative to the torch for operating said motor to maintain the spacing constant.

10. An apparatus for automatically controlling the spacing of a cutting torch and a workpiece, said apparatus including a workpiece contacting member, a solenoid for lifting said member, means for intermittently making and breaking the circuit of said solenoid to lift and drop said member, and means for adjusting the height of said torch when said contact member moves up or down beyond predetermined limits in respect to said torch.

11. An apparatus for automatically adjusting the spacing between a cutting torch and a part being cut, apparatus including means for adjusting the height of the torch, a member adjacent to said torch and contactable with the part being cut, and movable in respect to the torch, and means controlled by the amount of movement of said member for moving said torch toward and from the workpiece.

12. An apparatus for automatically adjusting the spacing between a cutting torch and a part being cut, said apparatus including power means for raising and lowering the torch, a member slidably connected to the torch, and means for dropping it onto and lifting it out of contact with the part being cut, and means controlled by the extent of said movement for raising or lowering the torch.

13. An apparatus for automatically controlling the spacing between a cutting torch and a part being cut, said apparatus including a rack bar connected to said torch, a pinion engaging said rack bar, a reversible motor for rotating said pinion, a workpiece contacting member adjacent to said torch, means for alternately lifting and dropping said member, and means for controlling the direction of rotation of and for actuating said motor when said contacting member moves beyond either of predetermined limits.

14. An apparatus for automatically adjusting the spacing between a cutting torch and a part being cut, said apparatus including a rack bar connected to said torch, a pinion engaging said rack bar, a reversible motor for rotating said pinion, a workpiece contacting member, means for raising and dropping said member, and means for actuating and reversing the direction of rotation of said motor when said contacting member moves beyond either of two predetermined limits in respect to the torch.

15. An apparatus for controlling the spacing between a cutting torch and a workpiece, including a torch carrier, a reversible motor connected to said carrier for adjusting the torch toward and from the workpiece, a workpiece contactor, means for moving said contactor alternately into and out of engagement with the workpiece, and means controlled by said contactor when its movement in either direction exceeds predetermined limits, for raising or lowering the torch.

16. An apparatus for controlling the spacing between a cutting torch and a workpiece, including a torch carrier, a motor for adjusting the height of said carrier, a workpiece contacting member, means for effecting movement of said member into and out of engagement with the workpiece, and means controlled by said member for raising or lowering said torch when said member moves down or up beyond predetermined limits in respect to said torch.

17. A torch cutting machine including a vertically movable torch carrier, a reversible motor for adjusting the height of said carrier, a workpiece contacting member adjacent to and movable in respect to said torch, and means actuated by a movement of the contact member beyond predetermined limits in respect to said torch for closing the circuit of said motor to rotate it in one direction or the other.

18. An apparatus for controlling the spacing of a cutting torch in respect to a workpiece, including a reversible motor for adjustably raising and lowering said torch in respect to the workpiece, a workpiece contacting member, a magnet coil, means for alternately making and breaking the circuit of said coil intermittently to raise said member out of engagement with said workpiece and drop it onto the workpiece, a continuously rotating cam for making and breaking the circuit of said coil, whereby said member is alternately raised and dropped, and means for controlling the circuit of said motor to rotate it in one direction or the other when said member is raised or lowered beyond predetermined limits.

19. An apparatus for controlling the spacing of a cutting torch from a workpiece as the cutting action progresses along the workpiece, said apparatus including a reversible motor for adjustably raising and lowering the torch, a contacting member movable intermittently into and out of engagement with the workpiece, and means controlled by said member for controlling the circuit of said motor and controlling the direction of its rotation when the movement of said member in either direction exceeds predetermined limits.

20. An apparatus for controlling the spacing of a cutting torch from a workpiece, including a reversible motor for adjustably raising and lowering the torch, a workpiece contacting member, means for effecting intermittent movement of said member into and out of engagement with said workpiece, and means for raising or lowering said torch when said member moves beyond a predetermined range.

21. An apparatus for controlling movement of a torch in respect to a workpiece, including a continuously rotating motor, a cam driven thereby, a workpiece contacting member, a solenoid for lifting said member, means controlled by said cam for making and breaking the circuit of said solenoid, whereby said member is raised and lowered, a reversible motor for adjustably raising and lowering said torch, and switch means operated by the movement of said contacting member for controlling the direction of rotation of said motor.

References Cited in the file of this patent

UNITED STATES PATENTS

| 1,057,132 | Einicher | Mar. 25, 1913 |
| 2,249,413 | Bechtle et al. | July 15, 1941 |
| 2,364,645 | Mott et al. | Dec. 12, 1944 |
| 2,489,305 | McLennan | Nov. 29, 1949 |
| 2,534,958 | Deming | Dec. 19, 1950 |